2,813,886

PREPARATION OF ARYLHALOSILANES

Hugh E. Ramsden, Metuchen, N. J., assignor to Metal & Thermit Corporation, New York, N. Y., a corporation of New Jersey No Drawing. Application November 20, 1953, Serial No. 393,512

23 Claims. (Cl. 260—448.2)

The present invention relates to a process of making arylhalosilanes, such as phenylchlorosilanes, through the use of Grignard reagents. Such arylhalosilanes, at the present time, are useful as intermediates in the preparation of silicones.

One object of the present invention is to increase the yield of arylhalosilanes in the reaction between and arylmagnesium halide (Grignard reagent) and a silicon halide.

Another object is to provide a new catalyst for increasing the yield of arylhalosilanes in the reaction between an arylmagnesium halide and a silicon halide.

The Grignard reagent employed in the process of the present invention may be made as, for example, by the reaction between chlorobenzene and magnesium. In the preparation of the Grignard reagent, in place of chlorobenzene in this reaction, other aryl halides which may be employed are bromobenzenes, iodobenzene, p-tolyl chloride, p-tolyl bromide, m-chlorotoluene, m-bromotoluene, m, o or p-chloro or bromoanisoles or phenetoles, chloro or bromoxylenes, chloro or bromoethylbenzenes, chloro or bromobiphenyls, chloro or bromonaphthalenes, chloro or bromoterphenyls and chloro or bromodiphenylethers. Different arylhalosilanes may be made stepwise from this Grignard reagent. The following reactions illustrate these stepwise formations as applied to the preparation of phenylchlorosilanes but these reactions are applicable to a process of making other arylhalosilanes.

$C_6H_5MgCl + SiCl_4 \rightarrow C_6H_5SiCl_3(I) + MgCl_2$
$C_6H_5SiCl_3 + C_6H_5MgCl \rightarrow (C_6H_5)_2SiCl_2(II) + MgCl_2$
$C_6H_5SiCl_2 + C_6H_5MgCl \rightarrow (C_6H_5)_3SiCl(III) + MgCl_2$ In place of the silicon tetrachloride $SiCl_4$ in the above reaction with the Grignard reagent, other silicon chlorides having the general formula $R_nSiCl_{4-n}$ may be employed. In this general formula, $n$ is any integral number from zero to 2, and R may be a hydrogen or a hydrocarbon radical substituted or unsubstituted, such as methyl, ethyl, propyl, butyl, phenyl, tolyl, etc., and the R's may be the same or different. Examples of such compounds are $HSiCl_3$
$RSiCl_3$
$RHSiCl_2$
$R_2SiCl_2$ wherein R has the same definition as above.

In accordance with the present invention, there is employed in connection with any or all of the reactions indicated above, a catalyst of the class consisting of the halides of the metals in the group IIb of the periodic table, namely, the metals mercury, zinc and cadmium. The catalyst desirably takes the form of mercuric chloride $HgCl_2$, zinc chloride $ZnCl_2$ or cadmium chloride $CdCl_2$. The amount of this catalyst added is small, varying between 1% and 2% by weight of the silicon halide.

Larger amounts of this catalyst do not appreciably improve the yield of arylhalosilanes.

In the reactions indicated above, compounds I, II and III are useful but compounds I and II are the more desirable. The conditions which favor the preparation of compounds I and II over the preparation of compound III are: (1) the addition of the Grignard reagent to the silicon tetrachloride to maintain a local excess of silicon tetrachloride and to favor stepwise reactions; (2) the maintenance of a low reaction temperature to keep the silicon tetrachloride from boiling out of the reaction zone; (3) the efficient stirring of the reaction mixture; and (4) the slow addition of the phenylmagnesium chloride. Use of excess silicon tetrachloride tends to cause a greater formation of compounds I and II at the expense of compound III, whereas the use of stoichiometric quantities to form compound II yields a larger quantity of compound III. Thus, it is preferred to employ silicon tetrachloride in slight excess of that necessary to form the compound II.

The catalyst zinc chloride or cadmium chloride may be added either (1) to the magnesium in the formation of the Grignard reagent, phenylmagnesium chloride, so that it will be present in the Grignard reagent when added to the silicon tetrachloride in the preparation of the phenylchlorosilanes, (2) to the formed Grignard reagent before it is added to the silicon tetrachloride, (3) to the silicon tetrachloride before the addition of the Grignard reagent, or (4) to the mixture of Grignard reagent and silicon tetrachloride. In the four cases, the yields are comparable.

The catalyst mercuric chloride preferably should not be added to the magnesium in the formation of the Grignard reagent, since it is reduced by the magnesium and the final yield will be lowered. The mercuric chloride may, however, be added to the Grignard reagent before said reagent is added to the silicon tetrachloride or may be added to the silicon tetrachloride or to the mixture of Grignard reagent and silicon tetrachloride.

After the reaction of the Grignard reagent and silicon tetrachloride in the presence of the catalyst described is completed, the resulting mixture is filtered and the filtrate may be fractionated to obtain the different phenylchlorosilanes. The yield is between 60–85% by weight based on silicon.

There will be obtained by the process described above, the compounds I, II and III, a small amount of residue as well as some biphenyl. The residue may be partially $(C_6H_5)_4Si$ although it is likely that there has been some hydrolysis of the chlorine groups to give compounds such as:

$(C_6H_5)_3SiOSi(C_6H_5)_3$

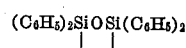

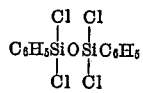

and higher polymers

These, it is believed, arise from the use of silicon tetrachloride which has contacted moisture to form $Cl_3SiOSiCl_3$, or it may arise from the presence of moisture in any of the reactants, or from the pickup of moisture from air during transfer. It has been found in accordance with the present invention, that the rigid exclusion of moisture and the distillation of the silicon tetrachloride before use, cuts down on this residue.

Ordinarily phenylmagnesium chloride contains as impurities such compounds as xenylmagnesium chloride and terphenylmagnesium chloride, and these, it is believed, form silicon compounds high-boiling enough to remain as part of the residue.

Another contribution to the residue is believed due to the oxidation by air of the Grignard reagent, arylmagnesium chloride, to $C_6H_5OMgCl$ producing $Si-O-C_6H_5$ compounds, which again are high-boiling and remain behind in the residue. This may be avoided by carrying out the reactions of the present invention in an inert atmosphere, such as nitrogen.

The following examples illustrate certain ways in which the principle of the invention has been applied, but are not to be construed as limiting the broader aspects of the invention:

Example I

Phenylmagnesium chloride prepared from one mole of magnesium and an excess of chlorobenzene (up to 5 moles total) is added dropwise to a stirred mixture of one-half mole of silicon tetrachloride, mercuric chloride (1 or 2% based on the $SiCl_4$), and a small quantity of chlorobenzene solvent. The reaction may be cooled during addition or allowed to warm up. Cooling is preferable. After completion of the addition, the mixture is heated at reflux until the green-yellow color becomes tan to grey. The mix is cooled, filtered (the filter cake is slurried with chlorobenzene several times to remove phenylsilicon compounds); the filtrate and extracts are stripped free of chlorobenzene, and the crudes are vacuum-distilled to effect separation. A run yielded:

| Fraction | Press., mm. | Pot Temp., °C. | Head, °C. | Wgt., gms. | Percent Si | Percent Cl | Remarks |
|---|---|---|---|---|---|---|---|
| 1 | 10 | 111–161 | 73–77 | 21.2 | 13.01 | 49.1 | liquid. |
| 2 | 10 | 178–197 | 118–132 | 3 | 2.85 | 4.52 | biphenyl. |
| 3 | 10 | 196–236 | 146–162 | 22.2 | 10.3 | 24.9 | liquid. |
| 4 | 4 | 220–248 | 168–204 | 20.3 | 9.01 | 14.8 | solid. |
| Residue | | | | 29.1 | 7.8 | 11.4 | brown wax, no Hg in residue. |

(A yield of 73% based on silicon is obtained. A run without catalyst gives lower yields of the order of 40%.)

Example II

Heated phenylmagnesium chloride (from 1 mole of Mg and 5 moles of chlorobenzene) and 0.77 gram of cadmium chloride (added to Grignard and stirred) were added slowly to 0.45 mole of silicon tetrachloride. The reaction mix was heated and stirred during the addition. The final temperature during the addition was 65° C. After completion of the addition, the mix was heated to reflux )131–132° C.) until the color became light tan. Some $SiCl_4$ was lost by volatilization and failure to condense. The mix was cooled and filtered. The salt cake was added to acidified water and an insoluble fraction obtained (wt. 13 g.; percent Si, 14.05; percent Cl, 10.7). The filtrate was stripped free of chlorobenzene and rapidly fractionated through a short (one-foot) packed column to yield the following fractions:

| | Wt., grams | Percent Si | Percent Cl |
|---|---|---|---|
| #1 | 13.9 | 12.4 | 44.2 |
| #2 | 5.3 | 12.45 | 38.5 |
| #3 | 13.8 | 9.12 | 19.1 |
| #4 | 8.5 | 11.15 | 24.1 |
| Residue | 45.2 | 9.74 | ¹ 13.6 |

¹ Yellow wax.

A silicon yield in products of about 90% was obtained.

The above fractions can be carefully fractionated to yield essentially pure phenyltrichlorosilane, diphenyldichlorosilane, triphenylchlorosilane, and small amounts of biphenyl.

Without $CdCl_2$ catalyst a yield of 40% is obtainable.

Example III

Phenylmagnesium chloride was prepared from 2 moles of magnesium and 10 moles of chlorobenzene. To this suspension was added 1.5 grams of zinc chloride. The suspension was then added slowly to 0.9 mole (153 g.) of silicon tetrachloride in 300 ml. of chlorobenzene. The reaction was heated during the addition which took 35 minutes. The final mixture was heated at reflux until its color became grey to tan. It was then cooled slightly, filtered, the precipitate washed with chlorobenzene, and the filtrate and washings combined. The chlorobenzene was stripped by distilling at 80–100 mm. pressure. The stripped crude was then distilled at lower pressure to yield rough fractions as follows:

| | Percent Si | Percent Cl |
|---|---|---|
| $C_6H_5Cl$ strip—1188.6 g. | 1.32 | 4.7. |
| Cut #B ($C_6H_5Cl$)—137.2 g. | (10.0) | |
| #I—25.4 g., 53° C. to 121° C. at 5 mm. | 10.22 | 37.5. |
| #II—44.8 g., 134–161° C. at 4 mm. | 8.7 | 21.4. |
| #III—16.3 g., 142–195° C. at 2 mm. | 10.06 | 23.6 solid. |
| #IV—35.1 g., 196–220° C. at 2 mm. | 8.9 | 14.5 viscous liquid. |
| #V—6.3 g., 221–228° C. at 2 mm. | | |
| Residue—36.0 g., cools to solid resin. | 7.2 | 9.8. |
| Salt Cake, water-insoluble—21.8 g. | 9.02 | 6.4. |

A yield of roughly 68–77% based on silicon was obtained.

While the invention has been described with particular reference to specific embodiments, it is to be understood that it is not to be limited thereto but is to be construed broadly and restricted solely by the scope of the appended claims.

What is claimed is:

1. The process of preparing an arylhalosilane which comprises reacting an arylmagnesium halide with a silicon halide in the presence of catalytic amounts a compound of the class consisting of mercuric halide, zinc halide and cadmium halide.

2. The process of preparing a phenylhalosilane which comprises reacting a phenylmagnesium halide with a silicon halide in the presence of catalytic amounts a compound of the class consisting of mercuric chloride, zinc chloride and cadmium chloride.

3. The process of preparing a phenylhalosilane as described in claim 2, wherein the catalyst is present in amounts ranging from 1% to 2% by weight of the silicon halide.

4. The process of preparing a phenylchlorosilane which comprises reacting phenylmagnesium chloride with silicon tetrachloride in the presence of catalytic amounts a compound of the class consisting of mercuric chloride, zinc chloride and cadmium chloride.

5. The process as described in claim 4, wherein the catalyst is present in amounts ranging from 1% to 2% by weight of the silicon tetrachloride.

6. The process of preparing phenylchlorosilanes which comprises reacting phenylmagnesium chloride with silicon tetrachloride in the presence of catalytic amounts a compound of the class consisting of mercuric chloride, zinc chloride and cadmium chloride, removing the precipitate formed from the reaction mixture and subjecting the resulting liquid to fractional distillation to effect separation of the different phenylchlorosilanes.

7. The process of preparing phenylchlorosilanes, which comprises adding phenylmagnesium chloride to silicon tetrachloride in the presence of catalytic amounts of a compound of the class consisting of mercuric chloride, zinc chloride and cadimum chloride to effect a reaction while maintaining a local excess of said silicon tetrachloride.

8. The process of preparing phenylchlorosilanes, which comprises reacting phenylmagnesium chloride with silicon tetrachloride in the presence of catalytic amounts of a compound of the class consisting of mercuric chloride, zinc chloride and cadmium chloride, the silicon tetrachloride being in slight excess of stoichiometric proportions for the formation of diphenylsilicon dichloride.

9. A process according to claim 1, wherein said compound is a mercuric halide.

10. A process according to claim 1, wherein said compound is a zinc halide.

11. A process according to claim 1, wherein said compound is a cadmium halide.

12. A process according to claim 2, wherein said compound is a mercuric chloride.

13. A process according to claim 2, wherein said compound is a zinc chloride.

14. A process according to claim 2, wherein said compound is a cadmium chloride.

15. A process according to claim 3, wherein the catalyst is mercuric chloride.

16. A process according to claim 3, wherein the catalyst is zinc chloride.

17. A process according to claim 3, wherein the catalyst is cadmium chloride.

18. A process according to claim 4, wherein the compound is mercuric chloride.

19. A process according to claim 4, wherein the compound is zinc chloride.

20. A process according to claim 4, wherein the compound is cadmium chloride.

21. A process according to claim 5, wherein the catalyst is mercuric chloride.

22. A process according to claim 5, wherein the catalyst is zinc chloride.

23. A process according to claim 5, wherein the catalyst is cadmium chloride.

References Cited in the file of this patent

UNITED STATES PATENTS

| | | |
|---|---|---|
| 2,258,279 | Rochow | Oct. 7, 1941 |
| 2,426,122 | Rust | Aug. 19, 1942 |

FOREIGN PATENTS

| | | |
|---|---|---|
| 660,075 | Germany | May 17, 1938 |

OTHER REFERENCES

Kharasch et al.: "Grignard Reaction of Non-Metallic Substances" (1954), pages 713–724. Prentice-Hall, publishers, New York, N. Y.

Rochow: "Chemistry of the Silicones," 2nd edition (1951), pages 34–36.